United States Patent
Jaepel et al.

(10) Patent No.: US 7,243,069 B2
(45) Date of Patent: Jul. 10, 2007

(54) SPEECH RECOGNITION BY AUTOMATED CONTEXT CREATION

(75) Inventors: Dieter Jaepel, Richterswil (CH); Juergen Klenk, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 09/910,657

(22) Filed: Jul. 20, 2001

(65) Prior Publication Data

US 2002/0013705 A1    Jan. 31, 2002

(30) Foreign Application Priority Data

Jul. 28, 2000    (EP) .................................. 00116450

(51) Int. Cl.
*G10L 15/06* (2006.01)
*G10L 15/22* (2006.01)
*G10L 15/26* (2006.01)

(52) U.S. Cl. .................. 704/235; 704/244; 704/252
(58) Field of Classification Search ................ 704/231, 704/235, 243, 244, 251, 252, 254, 255, 256, 704/257

See application file for complete search history.

(56) References Cited

U.S. PATENT DOCUMENTS

| | | | | |
|---|---|---|---|---|
| 5,615,296 A * | 3/1997 | Stanford et al. | .......... | 704/270.1 |
| 5,680,511 A * | 10/1997 | Baker et al. | ................ | 704/257 |
| 5,748,841 A * | 5/1998 | Morin et al. | ................ | 704/257 |
| 5,799,273 A * | 8/1998 | Mitchell et al. | ............. | 704/235 |
| 5,970,460 A * | 10/1999 | Bunce et al. | ................ | 704/278 |
| 6,018,708 A * | 1/2000 | Dahan et al. | ................ | 704/244 |
| 6,064,959 A * | 5/2000 | Young et al. | ................ | 704/251 |
| 6,188,976 B1 * | 2/2001 | Ramaswamy et al. | ......... | 704/9 |
| 6,253,177 B1 * | 6/2001 | Lewis et al. | ................ | 704/235 |
| 6,308,151 B1 * | 10/2001 | Smith | ........................ | 704/235 |
| 6,430,551 B1 * | 8/2002 | Thelen et al. | ................... | 707/3 |
| 6,434,523 B1 * | 8/2002 | Monaco | ...................... | 704/257 |
| 6,473,734 B1 * | 10/2002 | Dvorak | ....................... | 704/235 |
| 6,484,136 B1 * | 11/2002 | Kanevsky et al. | ............. | 704/9 |
| 6,526,380 B1 * | 2/2003 | Thelen et al. | ................ | 704/251 |
| 6,529,902 B1 * | 3/2003 | Kanevsky et al. | ............. | 707/5 |
| 6,601,027 B1 * | 7/2003 | Wright et al. | ............... | 704/235 |
| 6,643,620 B1 * | 11/2003 | Contolini et al. | ........... | 704/270 |
| 6,789,231 B1 * | 9/2004 | Reynar et al. | .............. | 715/533 |
| 6,839,669 B1 * | 1/2005 | Gould et al. | ................. | 704/246 |
| 6,865,528 B1 * | 3/2005 | Huang et al. | ................... | 704/9 |
| 6,901,364 B2 * | 5/2005 | Nguyen et al. | ............. | 704/235 |
| 7,020,587 B1 * | 3/2006 | Di et al. | ........................ | 703/2 |
| 7,031,908 B1 * | 4/2006 | Huang et al. | .................. | 704/9 |
| 7,120,582 B1 * | 10/2006 | Young et al. | ............... | 704/255 |
| 7,149,970 B1 * | 12/2006 | Pratley et al. | .............. | 715/533 |

* cited by examiner

*Primary Examiner*—Martin Lerner
(74) *Attorney, Agent, or Firm*—Akerman Senterfitt (57) ABSTRACT

A method for speech recognition can include generating a context-enhanced database from a system input. A voice-generated output can be generated from a speech signal by performing a speech recognition task to convert the speech signal into computer-processable segments. During the speech recognition task, the context-enhanced database can be accessed to improve the speech recognition rate. Accordingly, the speech signal can be interpreted with respect to words included within the context-enhanced database. Additionally, a user can edit or correct an output in order to generate the final voice-generated output which can be made available.

38 Claims, 6 Drawing Sheets

(Prior Art)

SPEECH RECOGNITION BY AUTOMATED CONTEXT CREATION

CROSS-REFERENCE TO RELATED APPLICATIONS

This application claims the benefit of European Application No. 00116450.8, filed Jul. 28, 2000 at the European Patent Office.

BACKGROUND OF THE INVENTION

1. Technical Field

The present invention relates to the field of speech processing and speech recognition in general. In particular, the invention relates to systems and methods for generating an output by means of a speech input.

2. Description of the Related Art

Due to recent advances in computer technology, as well as recent advances in the development of algorithms for speech recognition and processing, speech recognition systems have become increasingly more powerful while becoming less expensive. Certain speech recognition systems can match the words to be recognized with words of a vocabulary. The words in the vocabulary usually are represented by a word models, which can be referred to as word baseforms. For example, a word can be represented by a sequence of Markov models. The word models can be used in connection with the speech input in order to match the input to the words in the vocabulary.

Most of today's speech recognition systems are continuously being improved by providing larger vocabularies or by increasing the recognition rate by employing improved algorithms. Such systems typically can include 100,000 words. Other products, for example the ViaVoice family of software available from International Business Machines Corporation, can include approximately 240,000 word entries. Many commercially available speech recognition systems operate by comparing a spoken utterance against each word in the system's vocabulary. Since each such comparison can require thousands of computer instructions, the amount of computation required to recognize an utterance grows dramatically with increasing vocabulary size. This increase in computation has been a major problem in the development of large vocabulary systems.

Some speech recognition systems can be trained by the user uttering a training text of known words. Through this training process, the speech recognition system can be tailored to a particular user. Such training can lead to an improved recognition rate. Additionally, there are bi-gram and tri-gram based recognition systems that can search for like-sounding words such as 'to', 'two', and 'too', by analyzing such words in a context of two consecutive words (di-gram technology) or three consecutive words (tri-gram technology). The di-gram technology and the tri-gram technology also can lead to an improved recognition rate.

One problem of conventional speech recognition systems can be that as the system vocabulary grows, the number of words that are similar in sound also tends to grow. As a result, there is an increased likelihood that an utterance corresponding to a given word from the vocabulary will be mis-recognized as corresponding to another similar sounding word from the vocabulary.

Different approaches are known in the art for reducing the likelihood of word confusion. One such method is called "pruning". Pruning is a common computer technique used to reduce a computation. Generally speaking, pruning reduces the number of cases which are considered by eliminating some cases from further consideration. Scores (representing the likelihood of occurrence in an input) can be assigned to the words in a vocabulary. The scores can be used to eliminate words from consideration during the recognition task. The score can be updated during the recognition task and words which are deemed irrelevant for the recognition are not considered any further.

Another technique used to cope with large vocabulary systems is that of hypothesis and test, which is, in effect, also a type of pruning. When features are observed in a speech input, the features are used to form a hypothesis that the word actually spoken corresponds to a subset of words from the original vocabulary. The speech input can be processed further by performing a more lengthy match of each word in this sub-vocabulary against the received acoustic signal. This sub-vocabulary is directly derived from the speech input.

Yet another approach for dealing with the large computational demands of speech recognition in large vocabulary systems, is the development of special purpose hardware to increase significantly the speed of such processing. There are for example special purpose processors that perform probabilistic frame matching at high speed.

There are a host of other problems which have been encountered in known speech recognition systems. These problems can include, but are not limited to, background noise, speaker-dependent utterance of words, and insufficient processing speed. All of these disadvantages and problems have so far prevented widespread use of speech recognition in many market domains. Accordingly, despite the recent advances in speech recognition technology, there is a great need to improve further the performance of speech recognition systems before such systems find larger distribution in the market.

SUMMARY OF THE INVENTION

It is an object of the present invention to provide a speech processing system and method having an increased ease of use. The method according to an illustrative embodiment of the present invention provides a procedure where a voice-generated output can be generated using a computer system. The output can be generated by receiving an input and automatically creating a context-enhanced database using information derived from the input. The voice-generated output can be generated from a speech signal by performing a speech recognition task to convert the speech signal into computer processable segments. During this speech recognition task, the context-enhanced database can be accessed to improve the speech recognition rate. For example, the speech signal can be interpreted with respect to the words included within the context-enhanced database. Additionally, a user can edit or correct the output to generate a final output which can be made available.

A speech processing system, in accordance with the present invention, can produce a voice-generated output. The system can include a module for automatically creating a context-enhanced database by using information derived from a system input. A speech recognition system for converting a speech signal into segments also can be included. The context-enhanced database can be accessed to find matching segments. The system further can include a module for preparing the voice-generated output with the matching segments and a module for enabling editing and/or correction of the output to generate a final output. The final output, or speech-generated output can be made available.

According to the present invention, the number of words which undergo an extensive match, for example an acoustic match, against uttered words can be drastically reduced. Using the present invention, speech recognition system implementations can be provided that are less expensive and computationally less demanding. In other words, the present invention can be used in smaller systems which are less powerful than presently available desktop computers. Advantages of the present invention are addressed in connection with the detailed description or are apparent from the description.

BRIEF DESCRIPTION OF THE DRAWINGS

There are shown in the drawings, embodiments which are presently preferred, it being understood, however, that the invention is not so limited to the precise arrangements and instrumentalities shown.

DETAILED DESCRIPTION OF THE INVENTION

According to the present invention, a scheme is provided that greatly simplifies the interaction between a user and a computer system. It is herein proposed to use available input information to provide improved and more accurate speech recognition. If a user works with a computer system, usually, there is at least one active application program, i.e., a program that is currently being used by the user. It is assumed that the user is working on or with this active application program. In many cases, the active application program can be closely related to the user's current work task. This can be illustrated by means of a simple example. Assuming that the user of a computer system (recipient) has received an electronic mail (E-mail) from another user, it is likely that the recipient will open the E-mail in order to print or read it. It is further assumed that the other user is expecting the recipient to respond to this E-mail. This means that the respective mailer software (e.g., Lotus Notes) can be active and that the E-mail is displayed in a window on the computer screen. It is highly likely, that the contents of this E-mail define the context for the recipient's response. Input information thus can be derived from this E-mail.

According to the present invention, input information can be derived in a pre-processing step which defines the contents for an output that is to be generated by the user of the computer system. In the above example, the input information can be derived from the text contained in the E-mail received. It is, however, also possible:

1. to derive the input information from a history of E-mails (e.g., a chain of inquiries and responses to these inquiries);
2. to derive the input information from a document that is currently on the computer screen (e.g., a scientific paper currently read by the user);
3. to derive the input information from a chain of related documents;
4. to derive the input information from linked documents;
5. to derive the input information from a specific folder or directory;
6. to derive the input information from attachments that are received with an E-mail;
7. to derive the input information from a spread sheet currently used by the user;
8. to derive the input information from the computer cache memory;
9. to derive the input information from the history information recorded by a web browser;
10. to derive the input information from a knowledge management system;
11. to derive the input information from an incoming message, e.g., an incoming request in a call center:
12. to derive the input information from a received facsimile;
13. to derive the input information from the result of a database search; and so forth.

This input information, no matter how it is generated, is assumed to define the context in which the user is expected to generate an output as mentioned above. According to the present invention, the user is enabled to generate this output by uttering words. The respective output thus can be referred to as a voice-generated output. For example, the voice-generated output can be an E-mail, a facsimile, a letter, a memo, or any other output (e.g., a reaction) that can be generated by a computer system.

To prepare the voice-generated output, the user is requested to utter words. This speech input undergoes a speech recognition task after having been transformed from an audio signal into a signal format that can be processed by a computer system. For this purpose, an audio system is employed. The audio system can include a microphone, a microphone followed by some audio processing unit(s), or similar means. The audio system is employed by the speech recognition system to receive the words uttered by the user, to transform the uttered words into an audio signal, and to feed this audio signal to a converter system.

The converter system can include an analog-to-digital (A/D) circuit, for example. The converter system can convert the audio signal into a signal format that can be processed by the computer system. In most implementations of the speech recognition system, and according to the present invention, the converter system generates a digital signal.

According to the present invention, a speech recognition task can be performed to convert the uttered words into computer-processable segments, such as word segments (e.g., letters or syllables), phonemes, phonetic baseforms, frames, nodes, frequency spectra, baseforms, word templates, words, partial sentences, and so forth. Computer-processable in the present context means a representation that can be processed by a computer system.

To perform speech recognition tasks in an efficient and reliable manner, a context-enhanced database can be generated using the input information received. The context-enhanced database can be directly derived from the input information, or can be derived from an existing database using the input information. The input information can be used, for example, to define a smaller, specific portion within a preinstalled larger lexicon. A context-enhanced database can include a few words up to several thousand words, preferably between 10 words and 1,000 words. The size of the context-enhanced database can depend upon the actual implementation of the inventive scheme and on the size of the input itself. According to the present invention, the context-enhanced database can be dynamically generated or updated depending on, or taking into account, the user's current or most recent activities.

As previously mentioned, the context-enhanced database can be generated directly from the input information or can be derived from an existing database using the input information. The latter can be done by generating a word list from the input information (e.g., by extracting words from an E-mail to be responded to) and by connecting or linking this word list to an existing lexicon. The word list can be connected or linked to the lexicon such that it acts as a filter or a first instance that can be accessed during a speech recognition task. In that case, the underlying lexicon need only be accessed if no matching word was found in the word list. Other ways of implementing this aspect of the invention will be discussed in further detail below.

During the speech recognition task, the context-enhanced database can be accessed in order to improve the speech recognition rate. The segments derived from the words uttered by the user when preparing an output can be interpreted in light of the words given in the context-enhanced database. According to the present invention, the number of processable segments which undergo an extensive match (e.g., an acoustic match) against uttered segments can be drastically reduced, since the matching is done—at least in a first run—with information in the context-enhanced database only.

According to the present scheme, the output can be prepared while the user talks into the audio system. In a subsequent step, the system can enable the user to edit or correct the output in order to generate a final output. There are different approaches that can be used to enable a user to edit or correct the output. The system can, for example, display the output on a screen to allow the user to read it and to intervene manually if there is something to be edited or corrected. Also, the system can highlight those words where there is a certain likelihood of misinterpretation (mis-recognition) of the user's speech, for example in the case of unknown words, similar sounding words, and the like. Other implementation examples are given in connection with specific embodiments.

After having finished the speech recognition task, the final output is made available for further processing. The final output can be sent via a mailer to another user, prepared for printing, mailed via a fax modem or a fax machine, stored in a memory, and so on. For this purpose, the output can be temporarily put into a memory from where it can be printed, transmitted, fetched by some other application program, or the like.

The present invention can improve known speech recognition schemes by providing a context-enhanced database which is derived from some input information that is assumed to be related to the user's current task. Thus, speech recognition can be performed in light of a well defined context rather than a huge lexicon. An output is generated by transcribing or synthesizing the human dictation in light of the a context-enhanced database. The expression "computer system" as used herein can be a synonym for any system that has some computational capability. Examples can include, but are not limited to, personal computers (PCs), notebook computers, laptop computers, personal digital assistants (PDAs), cellular phones, and the like.

A speech recognition system is a system that performs a speech recognition task. Typically, a speech recognition system is a combination of a general purpose computer system with speech recognition software. A speech recognition system also can be a special purpose computer system, such as a system with special purpose speech recognition hardware.

Speech recognition systems are marketed which can run on a commercial PC and which require little extra hardware except for an inexpensive audio system, for example a microphone, an audio card with an analog-to-digital (A/D) converter, and a relatively inexpensive microprocessor to perform simple signal processing tasks. Such systems can provide discrete word recognition. There are also computer systems which require just speech recognition software. The necessary hardware components are already present in the form of an integrated microphone and an A/D converter.

Figure 1:
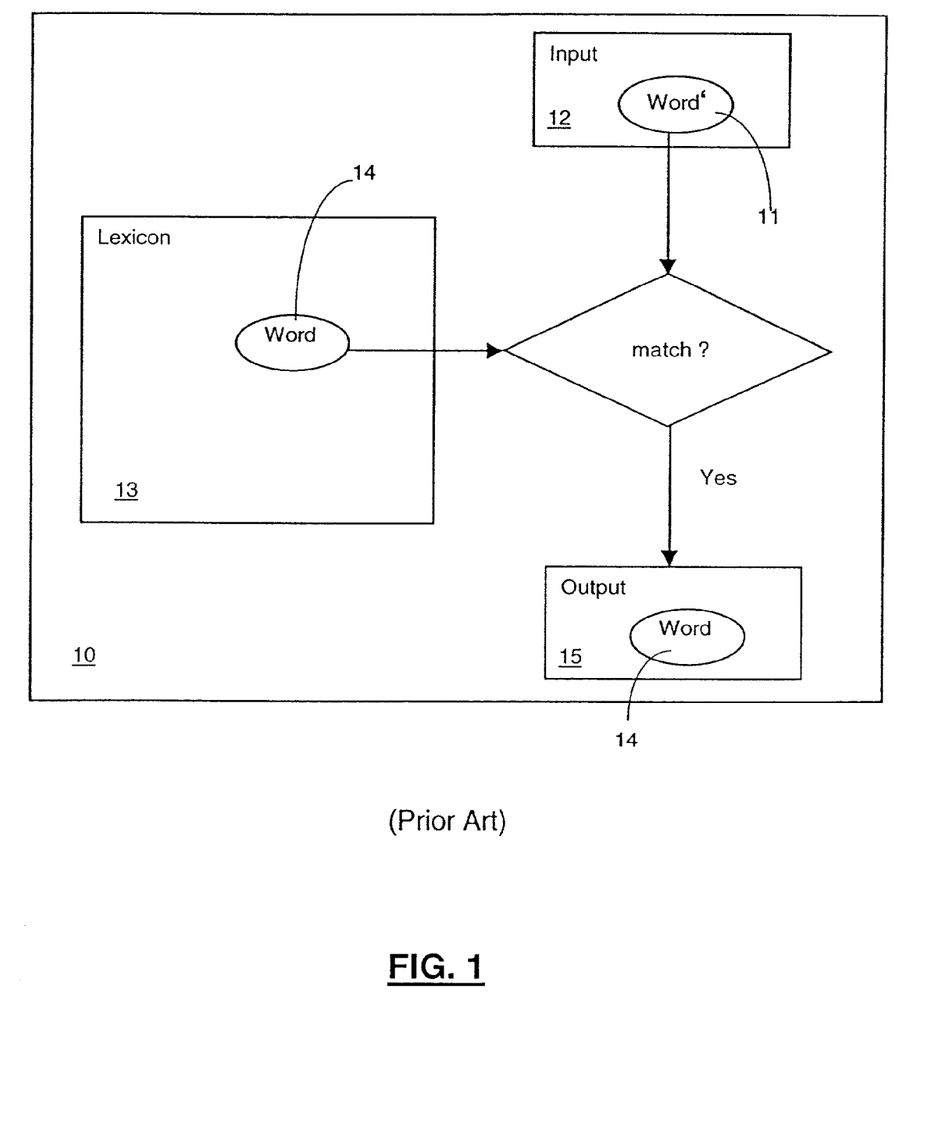
FIG. 1 shows a schematic block diagram of a conventional speech recognition system.

A schematic representation of a conventional speech recognition system 10 is illustrated in FIG. 1. Most speech recognition systems 10 operate by matching an acoustic description of words (e.g. Word 14) in their lexicon 13 against a representation of the acoustic signal generated by the utterance of the word (e.g. Word' 11 received as an input 12) to be recognized. If the input word 11 matches the word 14 in the lexicon 13, then an output 15 can be generated including the word 14. The speech signal representing the word 11 can be converted by an A/D converter into a digital (signal) representation of the successive amplitudes of the audio signal created by the speech. That digital signal can be converted into a frequency domain signal composed, at least in part, of a sequence of frames, each of which gives the amplitude of the speech signal in each of a plurality of frequency bands. Such systems commonly operate by comparing the sequences of frames produced by the utterance to be recognized with a sequence of nodes, or frame models, contained in the acoustic model of each word in their lexicon. Such a speech recognition system is called a frame matching system.

The performance of frame matching systems can be improved using a probabilistic matching scheme and a dynamic programming scheme, both of which have been known in the art for some time now. The application of dynamic programming to speech recognition is described in the article "Speech Recognition by Machine: A Review" D. R. Reddy, in Readings in Speech Recognition, A. Waibel and K. F. Lee, Editors, 1990, Morgan Kaufmann: San Mateo, Calif., pp. 8–38.

Figure 2:
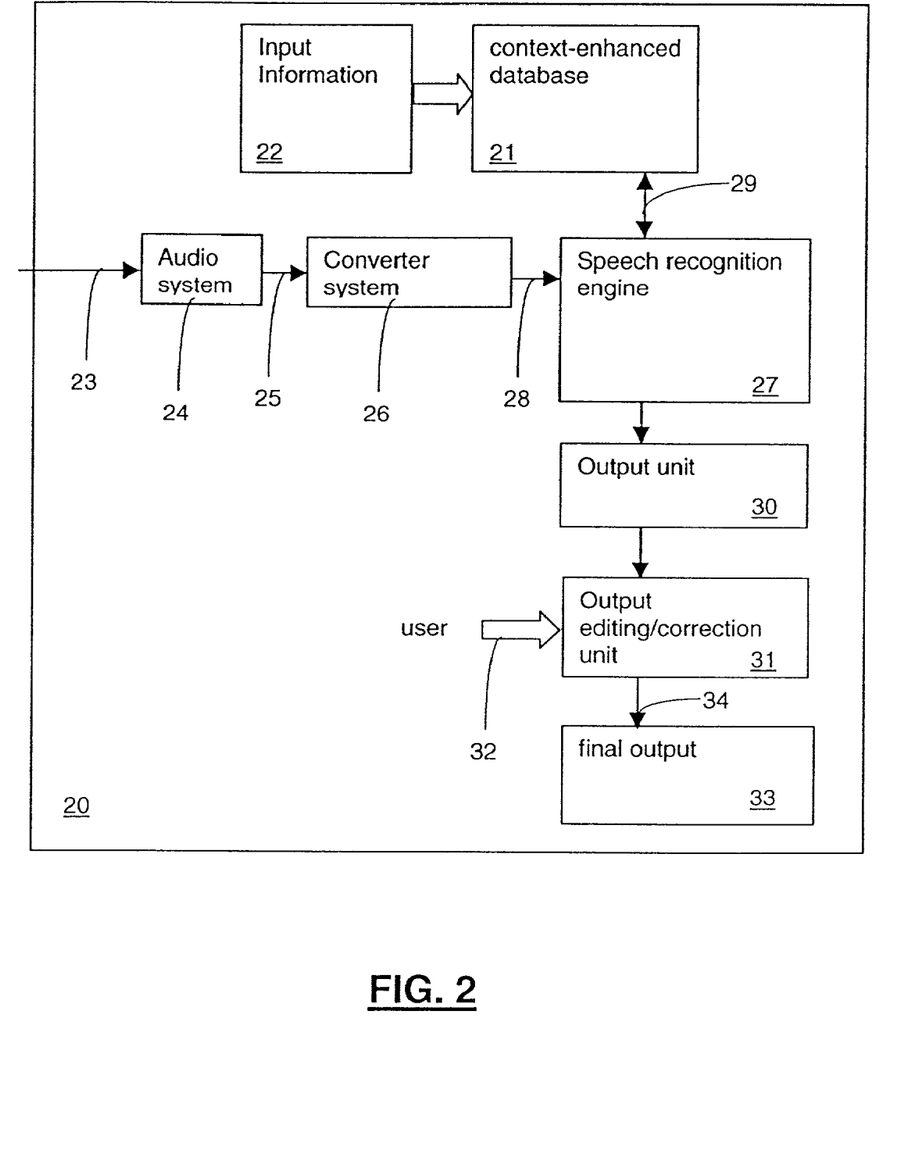
FIG. 2 shows a schematic block diagram of a first speech processing system according to the present invention.

One embodiment of a speech processing system 20, according to the present invention, is illustrated in FIG. 2. In a pre-processing step, a context-enhanced database 21 can be generated from input information 22, as described in one of the previous sections. If now a speech signal is received by an audio system 24, as indicated by arrow 23, an audio signal representing this speech signal can be forwarded via line 25 to a converter system 26. The audio system 24 can transform the acoustic signal received via 23 into the audio signal. This audio signal can be fed via line 25 to the converter system 26 where it is transformed into a signal format that is processable by the speech recognition engine 27. In most implementations, the converter system 26 is designed to generate a digital signal that is fed via line 28 to the speech recognition engine 27. This digital signal represents processable segments uttered by a user.

The speech recognition engine 27 can match the processable segments with segments in the context-enhanced database 21, as indicated by the arrow 29. All those segments for which a matching segment was found in the context-enhanced database 21 (called matching segments) can be fed to an output unit 30 where an output is generated. The user now can interact with the system 20 by editing and/or correcting the output, as indicated by the output editing/correction unit 31. The user interaction is illustrated by the arrow 32. The unit 31 can provide a final output 33 at an output line 34. Depending on the implementation, some of the steps can be performed concurrently.

Figure 3:
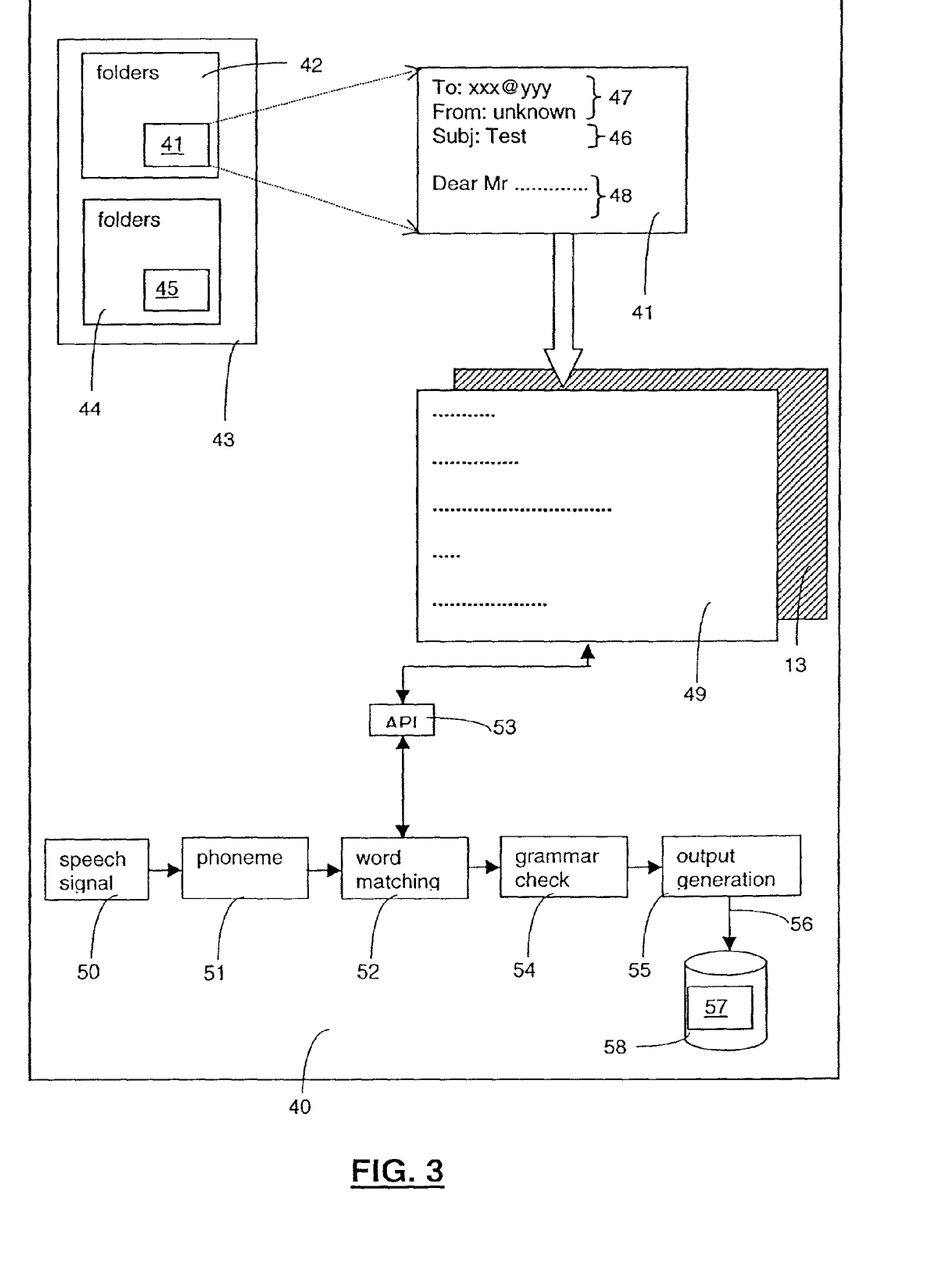
FIG. 3 shows a schematic block diagram of a second speech processing system according to the present invention.

Another embodiment of a speech processing system 40, according to the present invention, is illustrated in FIG. 3. In this example, an E-mail 41 from an E-mail folder 42 delivers the input information. The E-mail folder 42 can be the inbox of a mailer 43. The mailer 43 also can have an outbox 44, which can include at least one E-mail 45 waiting for delivery. As schematically shown in FIG. 3, the E-mail 41 contains the usual address information 47, a subject field 46, and a text body 48. According to the present embodiment, a word list 49 can be derived from the contents of the E-mail 41. The word list 49 can be derived from the address information 47, the subject field 46, the text body 48, or from any combination thereof. This word list 49 can be used to provide a context-enhanced database (not shown). In the present embodiment, the word list 49 sits on top of a lexicon 13 that has many word entries.

If the user now wants to prepare an output (e.g., a response to the E-mail 41), the user can, for example, activate the speech recognition module and talk into a microphone. The respective speech signal (box 50) can be analyzed by a conventional phoneme processing engine 51. Then a word matching process can be carried out by the word matching engine 52. This word matching engine 52 can include an application programming interface (API) 53 that serves as an interface for accessing a lexicon. A conventional speech recognition system can access a large lexicon, for example lexicon 13, through the interface 53 to find matching words. According to the present invention, however, the word list 49 can be accessed first through the API interface 53. If all words uttered by the user and represented by the speech signal are found in the word list 49, a grammar check can be performed by a grammar check unit 54 before an output 57 can be generated by the output generation unit 55. This output 57 can be provided at the output line 56 for further processing. In the present embodiment, the output 57 is the body of an E-mail that is stored in a memory unit 58. It can be fetched from this memory 58 and pasted into an outgoing E-mail. The E-mail 45 that sits in the outbox of the mailer 43 was generated exactly the same way. As soon as the computer system 40 connects to a network, the outgoing mail can be transmitted.

The word matching engine 52 can be implemented such that it always returns the best match for a word received from the unit 51. Part of the output can be presented to the user right away at output line 56 before the user has completed spelling the desired words. Advantageously, the speech processing system 40 can be implemented in such a way that the lexicon 13 can be accessed if there are words for which no matching counterpart was found in the word list 49. This can be done through the same API interface 53, or a separate API interface which can be provided for that purpose.

Figure 4:
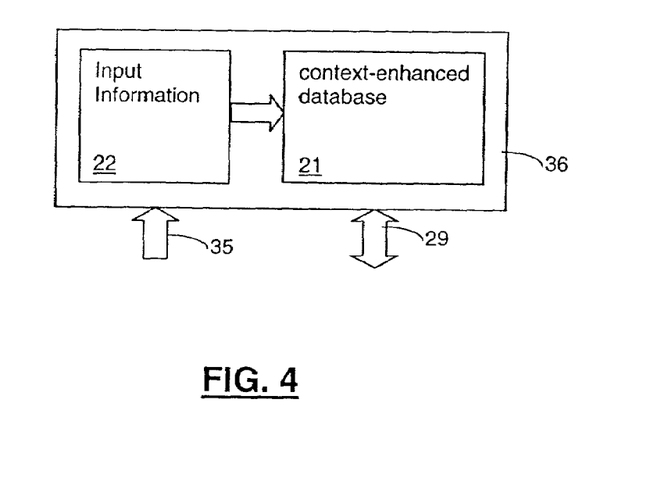
FIG. 4 shows a schematic block diagram of a building block of the first speech processing system according to the present invention.

The pre-processing module 36, which performs the pre-processing steps described in connection with the embodiment of FIG. 2, is schematically summarized in FIG. 4. As illustrated in FIG. 4, some input information 22 can be received via an input line 35. This input information 22 can stem from an E-mail currently processed in an editor or from a some other source, as indicated by the aforementioned items 1–13.

The context-enhanced database 21 can be automatically created by deriving information from the input information 22. There can be an interface 29 which allows the speech recognition engine 27 (cf. FIG. 2) to access the context-enhanced database 21. This context-enhanced database 21 can return matching segments or matching words.

Figure 5:
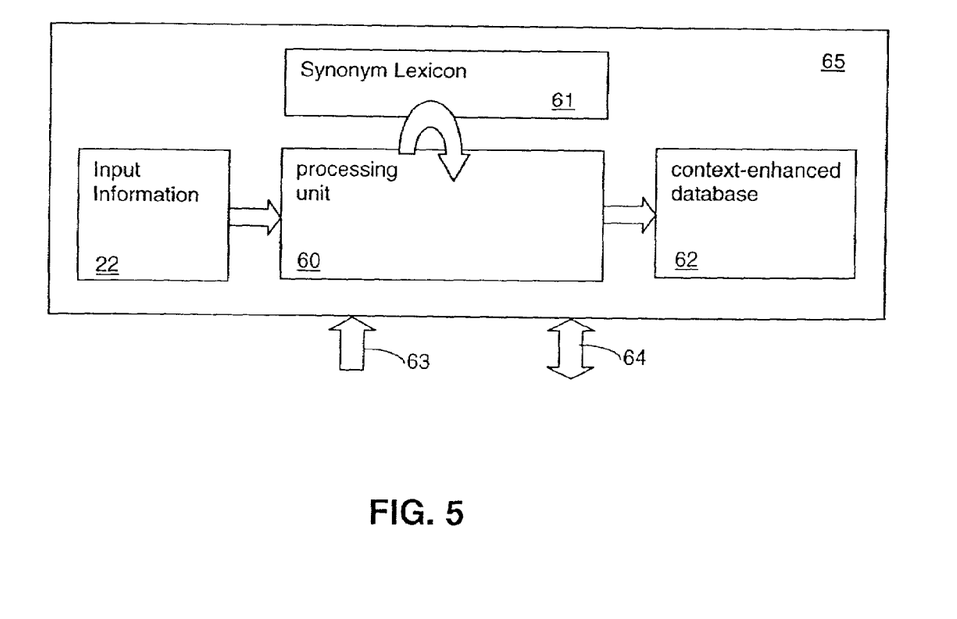
FIG. 5 shows a schematic block diagram of a third speech processing system according to the present invention.

Another pre-processing module 65 is shown in FIG. 5. The input information 22 is received via an input line 63. A processing unit 60 can be employed which can take information (e.g., segments or words) from the input information 22 and create a context-enhanced database 62. In order to obtain an improved context-enhanced database 62, a synonym lexicon 61 can be employed. If the input information comprises a Word A, the processing unit 60 can create several entries in the context-enhanced database 62; one for the original word, namely Word A, and as many entries as there are synonyms in the synonym lexicon 61. Assuming that there are three synonyms Word A', Word A", and Word A'" in lexicon 61, four entries (Word A, Word A', Word A", and Word A'" can be created in the context-enhanced database 62. In accordance with the present invention, if the user of a system speaks a word that is a synonym to a word included in the input information 22, the system can recognize this word and add it to the output being generated. Interface 64 (e.g. a standardized interface) can allow a speech processing system to access the context-enhanced database 62.

Figure 6:
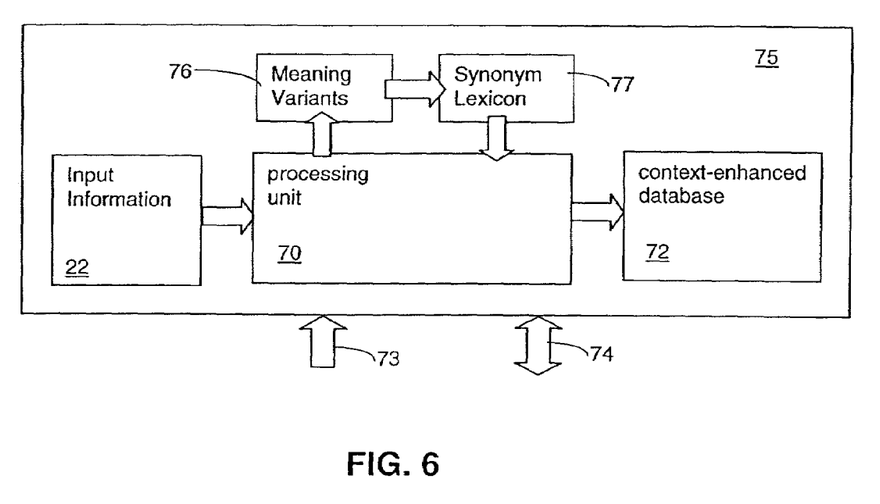
FIG. 6 shows a schematic block diagram of a fourth speech processing system according to the present invention.

Yet another pre-processing module 75 is depicted in FIG. 6. In this example, the input information 22 is received via an input line 73. A processing unit 70 can be employed which can take information (e.g., segments or words) from the input information 22 and build a context-enhanced database 72. In order to obtain a context-enhanced database 72 with more word entries, a database 76 with meaning variants and a synonym lexicon 77 can be employed. If the input information includes a Word A (e.g., the word "plant"), the processing unit 70 can access the meaning variants database 76 in order to cheek whether there is more than one meaning for the Word A. In case of the word "plant", for example, the database 76 can include two entries. The first entry (Word A*) can identify the "living plant" and the second entry (Word A**) can identify the "building" or "industrial fabrication plant". Both of these meaning variants (Word A* and Word A) can be retrieved by the processing unit 70. Other information can be used by the processing unit 70** to identify which of the two variants (Word A* or Word A) is the one that is actually meant. If the input information contains the sentence "A plant was erected in 1985", for example, then it is clear from the context that the building (Word A) and not the living object (Word A*) is referenced. The synonym lexicon 77 now delivers synonyms for this second variant (Word A). This scheme allows the system to avoid misunderstandings due to the misinterpretation of different word variants. It resolves these issues while creating the context-enhanced database 72. The context-enhanced database 72 can be accessible via the interface 74**.

Figure 7:
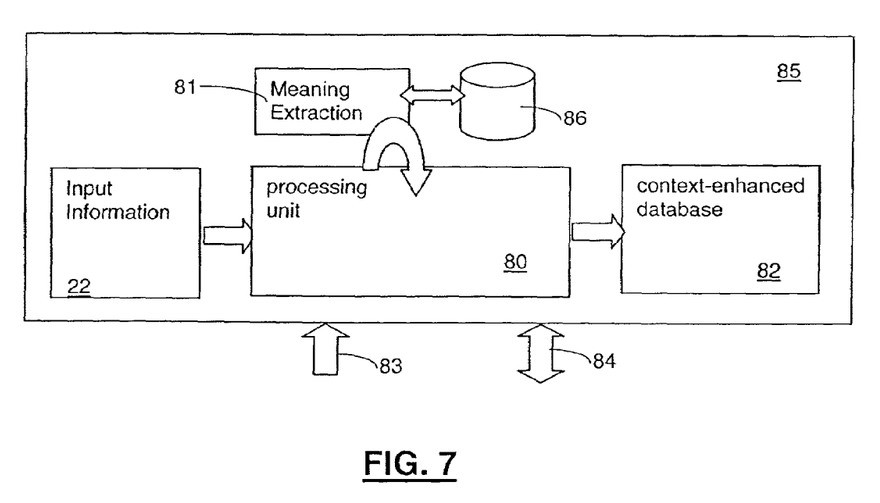
FIG. 7 shows a schematic block diagram of a fifth speech processing system according to the present invention.

The embodiment illustrated in FIG. 7 can be more powerful than the previous embodiments, since it employs a meaning extraction system 81 in connection with a knowledge database 86. The module 85 can include a memory wit the input information 22. The processing unit 80 can consult the meaning extraction system in order to get some understanding of what is contained in the input information 22. The meaning extraction system can be a system interacting with a fractal hierarchical knowledge database 86, as for example described and claimed in the European patent application entitled "Processing of textual information and automated apprehension of information", filed on Jun. 2, 1998, Pat. No. TW428138 and which is currently assigned to the assignee of the instant patent application. Such a meaning extraction system 81 can understand—at least to some extent—what is meant by the input information 22. It further can extract additional information believed to be associated or related. Thus, the processing unit 80 can build a context-enhanced database 82 that is 'richer' in that it not only contains the words that were found in the input information, but also information that is deemed to be related. The context-enhanced database 82 can be accessible via the interface 84. The input information 22 can be received via an input line 83.

Figure 8:
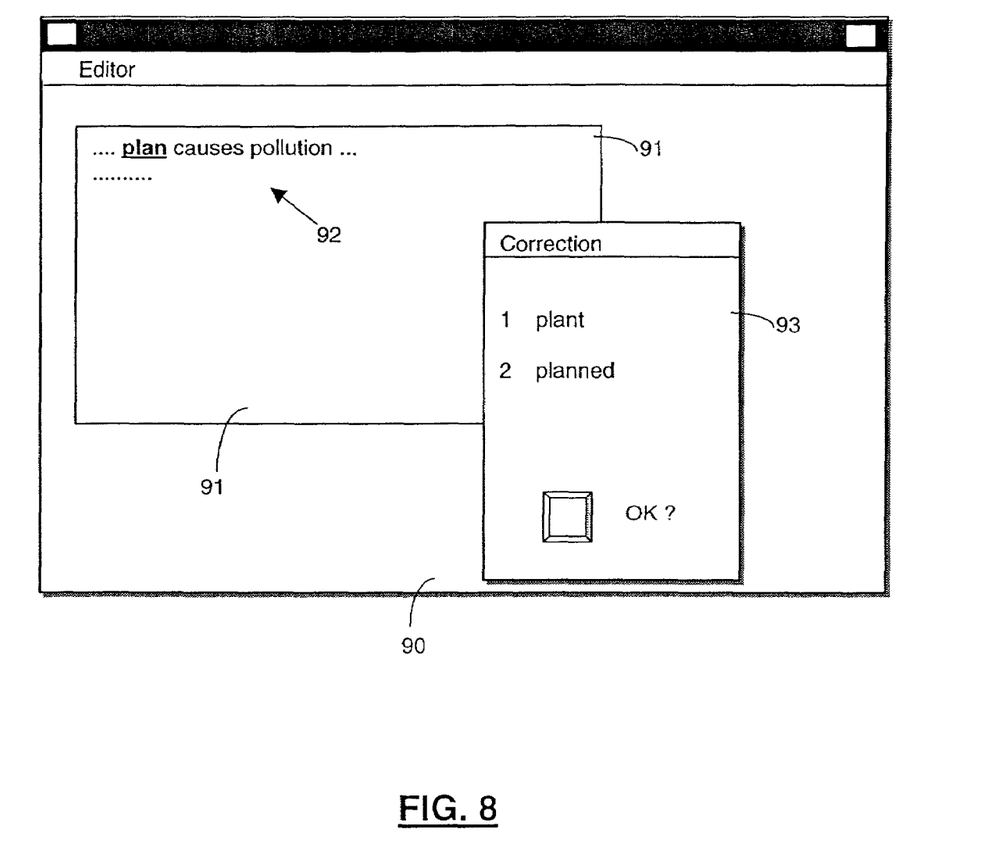
FIG. 8 shows an exemplary graphical user interface (GUI) for use with a speech processing system according to the present invention.

An example of a graphical user interface (GUI) for use with a simple speech recognition system is illustrated in FIG. 8. The GUI can include an editor 90 with a text-editing window 91. The speech recognition system can display the result of a speech recognition exercise where the user has uttered the partial sentence ". . . plant causes pollution . . . ".

As shown in FIG. 8, recognition of the user uttered sentence was, for the most part, accurate, with the exception of the word "plant", which was misunderstood by the system. As shown in the text-editing window 91, the system can transform the partial sentence and can display the resulting output 92. As shown, the system has output the word "plan" rather than the word "plant". The user now can edit/correct the output 92. To do so, the user can double-click on a word that is believed to be misspelled. The system can highlight the respective word. In the present example, the word "plan" is highlighted using the mouse. A correction window 93 can be opened that offers different alternatives 1–2 for the word "plan". If a meaning extraction system, similar to one in FIG. 7, is employed in the background, the processing system can tell from the context of the context-enhanced database that an industrial fabrication plant was intended. The system thus can offer the best matching word in the uppermost position 1 in the correction window 93. The system can determine that the other word "planned" is not likely to be relevant since this word does not make sense in the present context. By clicking on the OK-button, the word "plan" can be corrected so that it reads "plant".

A speech recognition system according to the present invention can be realized such that the word "plan" is automatically corrected. This can be achieved because the system can recognize that the word "plant" is the only word that makes sense in the present context.

An implementation of the present invention that makes use of a word list (context-enhanced database) generated from an active window (e.g., an E-mail) can check whether the word "plan" is included in the context-enhanced database. If this word is not in the context-enhanced database, the system can replace it with the word "plant", provided that the word "plant" is in the context-enhanced database. A system according to the one illustrated in FIG. 7 can determine that the combination of the words "pollution" and "plant" is valid and that the combination of "pollution" and "plan" is not valid. This capability also allows for automatic corrections.

According to one embodiment of the present invention, a template (form) can be generated automatically from the input information. The voice-generated output can be inserted into the template. Such a template-based approach can be well suited for situations where a highly automated response is required and where the responses typically look the same. An example could be a booking system used by a chain of affiliated hotels.

The present invention can be used in connection with systems that process discrete speech (e.g., word-by-word) or continuous speech. Advantageously, a system according to the present invention can include a speech synthesizer that converts the final output into a speech output. Such a speech synthesizer can include synthesizer hardware with a parameter store containing representations of words to be output, as well as a loudspeaker, for example.

Another embodiment of the present invention can include a fall-back mode or procedure which can be engaged in those situations where no matching words are found. Such a fall-back mode or procedure can offer the user a simple interface for typing the missing words.

According to another embodiment of the present invention, the context-enhanced database can be dynamically generated while input information is received. A first guess context-enhanced database can be generated and then constantly updated as additional input information is received. For example, a call can be received on a call-in line of a call center. The call center system can route the call to an automated call handler which asks questions. The caller can respond by uttering words or alternatively by pressing buttons on the phone While this interaction continues, a first guess of a context-enhanced database can be generated. If the caller is not calling for the first time, caller specific information can be fetched from a memory. This caller specific information can be used to generate a context-enhanced database, or an old context-enhanced database can be retrieved that was generated during a previous call of the same caller. The context-enhanced database can be constantly updated as the caller reveals additional information about the reason for calling. An output can be generated (e.g. a confirmation fax) by the operator of the system. In order to do so, the operator speaks into a microphone. The words he utters can be transformed and processed referring to the most current version of the context-enhanced database. The final output can be temporarily stored, printed, signed, and faxed to the caller's fax number.

Using the present invention, one is able to transcribe human dictation into an output, such as a letter or an E-mail. This greatly increases the speed and ease with which humans can communicate with other humans using computer-generated letters or E-mail. Additionally, using the present invention, humans can record and/or organize their own words and thoughts. This can be done by storing a voice-generated output in a database, or by using the voice-generated output to update a knowledge database.

Another advantage of the present invention is that it can be used on PDA or phone-like systems which lack an adequate keyboard. With the proposed embodiments, the speed of retrieval and the recognition rate can be improved since the context-enhanced database enables faster and more reliable matching.

What is claimed is:

1. In a speech recognition system, a method of speech recognition comprising:
   (a) receiving non-voice input in a computer system communicatively linked to the speech recognition system, said input having been sent to a user from a different user and comprising at least one of text contained in an e-mail sent or received by the user, information in a document attached to an e-mail sent or received by the user, information in a document viewed by the user on a display of the computer system, information in a plurality of linked documents accessible to the computer system, information in a spread sheet executing on the computer system, facsimile information received via a facsimile device connected to the computer system, call center information received via calling device connected to the computer system, and information recorded by a web browser executing on the computer system;

(b) creating a word list defining a context-enhanced database based upon said input or modifying an existing context-enhanced database by adding a word list created based upon said input, wherein said created and modified context-enhanced databases are dynamically generated based upon at least one of a current activity performed by the user on the computer system and a past activity performed by the user on the computer system within a predetermined time interval, said current and past activities comprising at least one of sending or receiving an e-mail, displaying a document contained in an e-mail, displaying information contained in a spread sheet executing on the computer system, receiving facsimile information via a facsimile device connected to the computer system, receiving call center information via a calling device connected to the computer system, and receiving information recorded by a web browser executing on the computer system;

(c) preparing a first textual output from the speech signal by performing a speech recognition task to convert a speech signal into said first textual output, wherein said context-enhanced database is accessed to improve the speech recognition rate, wherein said speech signal is parsed into a plurality of computer processable speech segments, wherein said first textual output comprises a plurality of text segments, each corresponding to one of the computer processable speech segments, and wherein selective ones of the text segments are generated by matching a computer processable speech segment against an entry within the context-enhanced database, said context-enhanced database including a plurality of entries, each entry comprising a speech utterance and a corresponding textual segment for the speech utterance;

(d) enabling editing of said first textual output to generate a final voice-generated output; and (e) making said final voice-generated output available.

2. The method of claim 1, wherein each of said computer-processable speech segments represent digitally encoded spoken words, and wherein each of the text segments is a word in text format.

3. The method of claim 2, wherein during said speech recognition task, said speech signals are analyzed to determine whether matches exist within the context-enhanced database for the computer-processable speech segments before another database is searched to locate text matches for the computer-processable speech segments.

4. The method of claim 2, wherein a second database is accessed to find a matching word for each of said words for which no matching word was found in said context-enhanced database, wherein the context-enhanced database is created from said input and from entries within the second database.

5. The method of claim 1, wherein during said speech recognition task, said speech signals are analyzed to determine whether matches exist within the context-enhanced database for the computer-processable speech segments before another database is searched to locate text matches for the computer-processable speech segments.

6. The method of claim 1, wherein at least two steps selected from the group consisting of steps (b), (c), (d), and (e), are performed concurrently.

7. The method of claim 1, wherein said speech utterances and said textual segments of said context enhanced database represent words.

8. The method of claim 1, wherein said speech signal is interpreted as part of said speech recognition task in light of entries included in said context-enhanced database.

9. The method of claim 1, wherein the creating step further comprises the step of:
creating the context-enhanced database from those entries of a context-independent database having words included within the word list.

10. The method of claim 1, wherein said voice-generated output is a physical output.

11. The method of claim 10, wherein said voice-generated output is temporarily put into a memory.

12. The method of claim 1, wherein said editing is enabled by highlighting words of said first textual output having a predetermined likelihood of misinterpretation of said speech signal.

13. The method of claim 1, wherein said context-enhanced database is derived from an existing database based upon said input.

14. The method of claim 1, wherein said context-enhanced database is dynamically generated specifically for the specified context, wherein the method further comprises the step of:
detecting an event signifying the context has changed; and
responsively updating said context-enhanced database.

15. The method of claim 1, further comprising the steps of:
automatically detecting a change in one or more active applications;
responsive to the detected change, automatically deriving new input; and
responsive to the new input, dynamically updating the context-dependant database based upon the new input.

16. The method of claim 1, wherein one or more of a synonym lexicon and a meaning variants database is accessed when preparing said voice-generated output.

17. A machine-readable storage, having stored thereon a computer program having a plurality of code sections executable by a machine for causing the machine to perform the steps of:

(a) receiving non-voice input in a computer system communicatively linked to the speech recognition system, said input having been sent to a user from a different user and comprising at least one of text contained in an e-mail sent or received by the user, information in a document attached to an e-mail sent or received by the user, information in a document viewed by the user on a display of the computer system, information in a plurality of linked documents accessible to the computer system, information in a spread sheet executing on the computer system, facsimile information received via a facsimile device connected to the computer system, call center information received via calling device connected to the computer system, and information recorded by a web browser executing on the computer system;

(b) creating a word list defining a context-enhanced database based upon said input or modifying an existing context-enhanced database by adding a word list created based upon said input, wherein said created and modified context-enhanced databases are dynamically generated based upon at least one of a current activity performed by the user on the computer system and a past activity performed by the user on the computer system within a predetermined time interval, said current and past activities comprising at least one of sending or receiving an e-mail, displaying a document contained in an e-mail, displaying information contained in a spread sheet executing on the computer system, receiving facsimile information via a facsimile device connected to the computer system, receiving call center information via a calling device connected to the computer system, and receiving information recorded by a web browser executing on the computer system;

(c) preparing a first textual output from a speech signal by performing a speech recognition task to convert said speech signal into said first textual output, wherein said context-enhanced database is accessed to improve the speech recognition rate, wherein said speech signal is parsed into a plurality of computer processable speech segments, wherein said first textual output comprises a plurality of text segments, each corresponding to one of the computer processable speech segments, and wherein selective ones of the text segments are generated by matching a computer processable speech segment against an entry within the context-enhanced database, said context-enhanced database including a plurality of entries, each entry comprising a speech utterance and a corresponding textual segment for the speech utterance;

(d) enabling editing of said first textual output to generate a final voice-generated output; and (e) making said final voice-generated output available.

18. The machine-readable storage of claim 17, wherein each of said computer-processable speech segments represent digitally encoded spoken words, and wherein each of the text segments is a word in text format.

19. The method of claim 18, wherein during said speech recognition task, said speech signals are analyzed to determine whether matches exist within the context-enhanced database for the computer-processable speech segments before another database is searched to locate text matches for the computer-processable speech segments.

20. The method of claim 18, wherein a second database is accessed to find a matching word for each of said words for which no matching word was found in said context-enhanced database, wherein the context-enhanced database is created from said input and from entries within the second database.

21. The machine-readable storage of claim 17, wherein during said speech recognition task, said speech signals are analyzed to determine whether matches exist within the context-enhanced database for the computer-processable speech segments before another database is searched to locate text matches for the computer-processable speech segments.

22. The machine-readable storage of claim 17, wherein at least two steps selected from the group consisting of steps (b), (c), (d), and (e), are performed concurrently.

23. The machine-readable storage of claim 17, wherein speech utterances and said textual segments of said context enhanced database represent words.

24. The machine-readable storage of claim 17, wherein said speech signal is interpreted as part of said speech recognition task in light of entries included in said context-enhanced database.

25. The machine-readable storage of claim 17, wherein the creating step further comprises the step of:
creating the context-enhanced database from those entries of a context-independent database having words included within a word list.

26. The machine-readable storage of claim 17, wherein said voice-generated output is a physical output.

27. The method of claim 26, wherein said voice-generated output is temporarily put into a memory.

28. The machine-readable storage of claim 17, wherein said editing is enabled by highlighting words of said first textual output having a predetermined likelihood of misinterpretation of said speech signal.

29. The machine-readable storage of claim 17, wherein said context-enhanced database is derived from an existing database based upon said input.

30. The machine-readable storage of claim 17, wherein said context-enhanced database is dynamically generated specifically for the specified context, wherein the method further comprises the step of:
detecting an event signifying the context has changed; and responsively updating said context-enhanced database.

31. The machine-readable storage of claim 17, further comprising the steps of:
automatically detecting a change in one or more active applications;
responsive to the detected change, automatically deriving new input; and
responsive to the new input, dynamically updating the context-dependant database based upon the new input.

32. The machine-readable storage of claim 17, wherein one or more of a synonym lexicon and a meaning variants database is accessed when preparing said voice-generated output.

33. In a speech recognition system, a method of speech recognition comprising the steps of:
receiving non-voice input in a computer system communicatively linked to the speech recognition system, said input having been sent to a user from a different user and comprising at least one of text contained in an e-mail sent or received by the user, information in a document attached to an e-mail sent or received by the user, information in a document viewed by the user on a display of the computer system, information in a plurality of linked documents accessible to the computer system, information in a spread sheet executing on the computer system, facsimile information received via a facsimile device connected to the computer system, call center information received via calling device connected to the computer system, and information recorded by a web browser executing on the computer system;
creating a word list defining a context-enhanced database based upon the input or modifying an existing context-enhanced database by adding a word list created based upon the input, wherein said created and modified context-enhanced databases are dynamically generated based upon at least one of a current activity performed by the user on the computer system and a past activity performed by the user on the computer system within a predetermined time interval, said current and past activities comprising at least one of sending or receiving an e-mail, displaying a document contained in an e-mail, displaying information contained in a spread sheet executing on the computer system, receiving facsimile information via a facsimile device connected to the computer system, receiving call center information via a calling device connected to the computer system, and receiving information recorded by a web browser executing on the computer system;

parsing a received speech signal into a plurality of speech segments;

comparing said speech segments against entries in the context-enhanced database;

when matching entries are found in the comparing step, for each matching entry retrieving a textual segment from the context-enhanced database that is associated with the matching entry; and generating textual output for the speech signal that includes the retrieved textual segments.

34. The method of claim 33, further comprising the steps of:

when matching entries are not found in the comparing step, generating a textual segment for the speech segment using a context-independent database, wherein the generated textual output includes the generated textual segments.

35. The method of claim 34, wherein entries within the context-enhanced database are a subset of entries contained within the context-independent database that are derived from the context-independent database and the input.

36. The method of claim 33, wherein the creating step further comprises the step of:

creating the context-enhanced database from those entries of a context-independent database having words included within the word list.

37. The method of claim 33, further comprising the steps of:

automatically detecting a change in one or more active applications;

responsive to the detected change, automatically deriving new input; and responsive to the new input, modifying the context-dependant database based upon the new input.

38. The method of claim 37, further comprising the step of:

repeating the detecting step, the deriving step, and the modifying step of claim 37 to ensure the context-dependant database includes information for a current state of the active applications.

* * * * *